United States Patent
Moore

(10) Patent No.: US 11,008,927 B2
(45) Date of Patent: May 18, 2021

(54) ALTERNATIVE METHOD OF HEAT REMOVAL FROM AN INTERNAL COMBUSTION ENGINE

(71) Applicant: James Moore, Simi Valley, CA (US)

(72) Inventor: James Moore, Simi Valley, CA (US)

( * ) Notice: Subject to any disclaimer, the term of this patent is extended or adjusted under 35 U.S.C. 154(b) by 0 days.

(21) Appl. No.: 16/840,840

(22) Filed: Apr. 6, 2020

(65) Prior Publication Data

US 2020/0325813 A1 Oct. 15, 2020

Related U.S. Application Data

(60) Provisional application No. 62/832,184, filed on Apr. 10, 2019.

(51) Int. Cl.

| | |
|---|---|
| *F01P 3/18* | (2006.01) |
| *F01P 5/10* | (2006.01) |
| *F01P 11/10* | (2006.01) |
| *B60K 11/02* | (2006.01) |
| *F01P 3/02* | (2006.01) |
| *F01P 3/22* | (2006.01) |
| *B60K 11/06* | (2006.01) |
| *F01P 3/00* | (2006.01) |

(52) U.S. Cl.
CPC ............... *F01P 5/10* (2013.01); *B60K 11/02* (2013.01); *B60K 11/06* (2013.01); *F01P 3/02* (2013.01); *F01P 3/2285* (2013.01); *F01P 11/10* (2013.01); *F01P 2003/001* (2013.01); *F01P 2003/2214* (2013.01)

(58) Field of Classification Search
CPC ........ F01P 3/18; F01P 3/20; F01P 3/12; F01P 9/02; F01P 11/0295
See application file for complete search history.

(56) References Cited

U.S. PATENT DOCUMENTS

| | | | |
|---|---|---|---|
| 2,804,860 A | 9/1957 | Tacchella et al. | |
| 2,926,641 A | 3/1960 | Tacchella et al. | |
| 3,162,183 A | 12/1964 | Gratzmuller | |

(Continued)

FOREIGN PATENT DOCUMENTS

| | | |
|---|---|---|
| DE | 102004053123 | 10/2015 |
| GB | 421683 | 12/1934 |

(Continued)

*Primary Examiner* — Long T Tran
(74) *Attorney, Agent, or Firm* — Cislo & Thomas, LLP

(57) ABSTRACT

A condensation cooling system for motor vehicles is presented. The system, in principal part, comprises a liquid-to-liquid heat exchanger for circulating a first coolant, a coolant tank for circulating a second coolant, and a condensing panel or surface, where the condensing panel is part of the coolant tank and also functions as a vehicle body panel. These components are arranged in two circuits, i.e. an engine cooling circuit in which a first coolant is circulated and a vapor condensing circuit in which a second coolant is circulated. The two cooling circuits are interconnected by the coolant tank where the heat exchanger is positioned within the coolant tank such that it is immersed in the second coolant. The coolant tank may also be equipped with pressure release valves, electric fans and diffuser plates to control pressure and manage air and vapor flow internally within the tank.

21 Claims, 12 Drawing Sheets

(56) References Cited

U.S. PATENT DOCUMENTS

| | | | | |
|---|---|---|---|---|
| 3,309,020 | A | * | 3/1967 | Cobley ............... F01P 3/20 |
| | | | | 237/8 A |
| 3,838,668 | A | | 10/1974 | Hays |
| 4,367,699 | A | * | 1/1983 | Evans ............... F01P 3/2271 |
| | | | | 123/41.21 |
| 4,474,228 | A | | 10/1984 | Rogalski et al. |
| 4,550,694 | A | * | 11/1985 | Evans ............... F01P 9/00 |
| | | | | 123/41.02 |
| 4,649,703 | A | | 3/1987 | Dettling et al. |
| 5,355,846 | A | | 10/1994 | Ozawa |
| 7,062,913 | B2 | | 6/2006 | Christensen et al. |
| 7,246,485 | B2 | | 7/2007 | Ohki et al. |
| 7,603,977 | B2 | | 10/2009 | Heidrich |
| 7,640,967 | B2 | | 1/2010 | Bradley et al. |
| 7,673,593 | B2 | | 3/2010 | Justin |
| 9,605,906 | B2 | | 3/2017 | Styles et al. |
| 2005/0172644 | A1 | | 8/2005 | Zhang |
| 2006/0231047 | A1 | * | 10/2006 | Hiroshima ........... F01P 3/18 |
| | | | | 123/41.29 |
| 2007/0193291 | A1 | * | 8/2007 | Reddin ............ B60H 1/00357 |
| | | | | 62/239 |
| 2008/0223639 | A1 | * | 9/2008 | Barksdale ........... B62M 27/02 |
| | | | | 180/68.4 |
| 2009/0020958 | A1 | | 1/2009 | Soul |
| 2018/0156119 | A1 | | 6/2018 | Menheere et al. |

FOREIGN PATENT DOCUMENTS

| | | |
|---|---|---|
| GB | 2270375 | 8/1995 |
| JP | 2751337 | 5/1998 |
| JP | 3409187 | 5/2003 |
| JP | 3544377 | 7/2004 |
| KR | 152322 | 10/1998 |

* cited by examiner

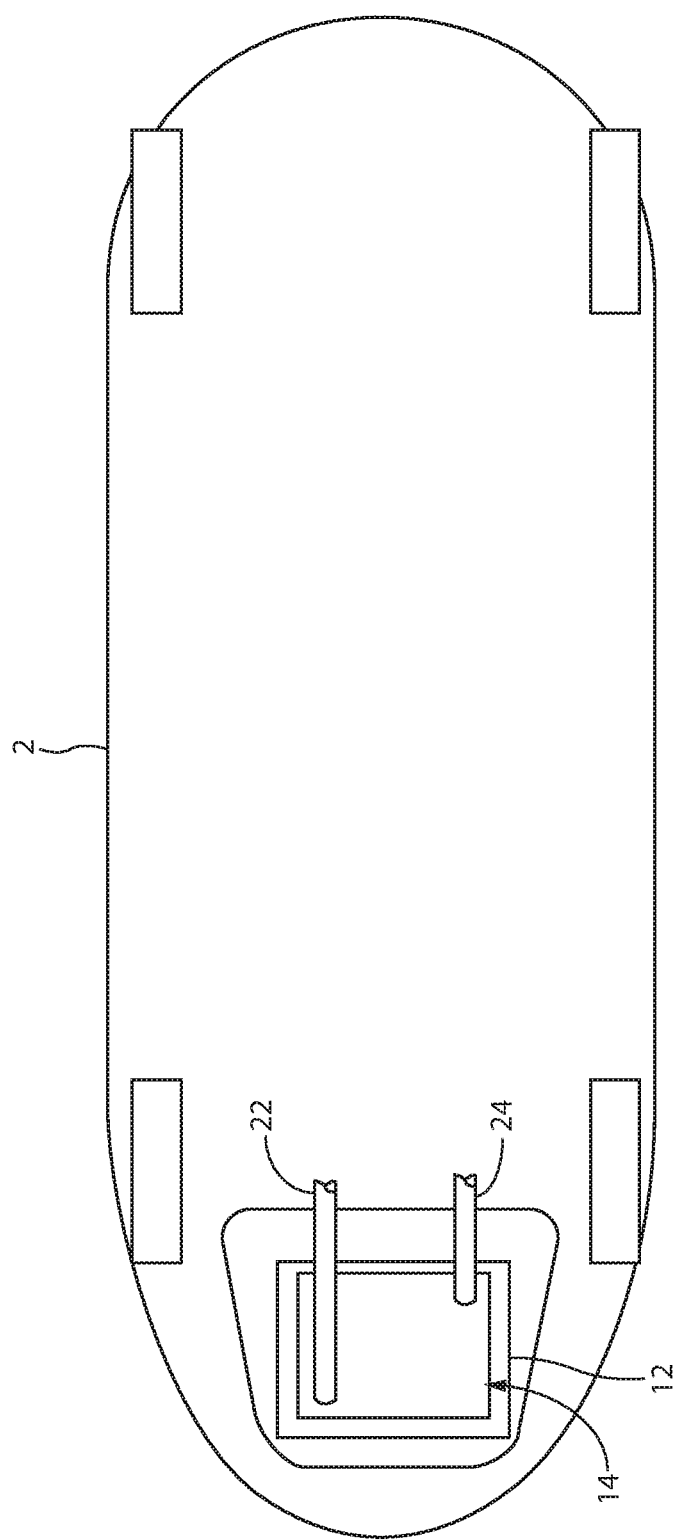

ALTERNATIVE METHOD OF HEAT REMOVAL FROM AN INTERNAL COMBUSTION ENGINE

CROSS-REFERENCES TO RELATED APPLICATION

This application claims the benefit of U.S. Provisional Application Ser. No. 62/832,184, filed Apr. 10, 2019 and entitled "Alternative Method of Heat Removal from an Internal Combustion Engine," which is incorporated herein by this reference.

BACKGROUND OF THE INVENTION

Field of the Invention

The present invention relates generally to cooling systems for internal combustion engines and more particularly to a condensation cooling system for use in a motor vehicle.

Background of the Invention

Removal of heat from an internal combustion engine is necessary for the proper function and survival of the engine. Conventional automotive cooling systems are pressurized, forced circulation, cooling systems in which water or a water-antifreeze mixture is circulated by an engine-driven or electrically driven pump in a single closed loop circuit. The cooling circuit comprises the engine water jacket, where heat from the engine's cylinders and cylinder heads is transferred to a liquid coolant flowing through the water jacket and, a radiator where the heat absorbed by the coolant in the engine is transferred to air flowing through the radiator.

Although conventional pressurized, liquid coolant systems have proven reliable in automotive vehicle applications, they have several inherent drawbacks. In an automobile, the radiator is typically of rectangular shape, relatively large, and mounted at the front of the car. With the radiator placed in this location, the shape of the front of the car is influenced by the shape and size of the radiator. Liquid-to-air radiators, such as those found on virtually every automobile, are by necessity placed in an airstream, creating a relatively substantial impediment to airflow. This results in drag which necessarily reduces fuel efficiency on virtually every car with an internal combustion engine.

Moving the radiator away from the front of the car, for example to the rear or side of the vehicle, would free the shape of the front of the vehicle from the design constraints imposed by a relatively large, rectangular radiator. Such alternative positioning would allow the front of the vehicle to be more aerodynamicaiiy shaped so as to reduce the drag of the vehicle, which would provide the benefit of lowering the power required to move the car, which in turn would allow for improved vehicle performance and/or increased fuel efficiency.

What is needed therefore is a vehicle cooling system that matches or exceeds the cooling capacity of conventional systems, yet allows for the radiator to be moved away from the front of the vehicle.

SUMMARY OF THE INVENTION

The condensation cooling system of the present invention improves upon the prior art by providing a cooling system that replaces the radiator of conventional automobile cooling systems with a liquid-to-liquid heat exchanger immersed in a coolant tank having a condensing surface exposed to airflow. The system allows the heat exchanger to be relocated from the front of a vehicle to the rear or side of a vehicle. Such alternative placement, allows for the front of a vehicle to be designed for greater aerodynamic efficiency which, given the reduction in vehicle drag, allows for improvements in vehicle performance and, in particular, fuel efficiency.

The condensation cooling system of the present invention in principal part comprises a liquid-to-liquid heat exchanger for circulating a first coolant, a coolant tank for circulating a second coolant, and a condensing panel or surface formed as part of the coolant tank. The condensing panel also forms or functions as a vehicle body panel. These components are arranged in two circuits, i.e. a first or engine cooling circuit in which a first coolant is circulated and a second or vapor condensing cooling circuit in which a second coolant is circulated. The two cooling circuits are interconnected by the coolant tank where the heat exchanger is positioned within the coolant tank such that it is immersed in the second coolant. The coolant tank will typically be equipped one or more pressure relief valves. The coolant tank may, optionally, be equipped with one or more electric fans and one or more diffuser plates, where both the fans and diffuser plates are mounted internally within the tank for the management air and vapor flow within the coolant tank.

Liquid cooled motor vehicle internal combustion engines feature a coolant jacket which is commonly referred as a "water jacket," which comprises a collection of passages around the cylinders and cylinder heads of an engine. In conventional cooling systems, coolant is circulated by a coolant pump, commonly referred to as a water pump, through the water jacket and through a liquid-to-air heat exchanger, commonly referred to as a radiator. Heat is transferred from the coolant to the radiator by convection cooling and via the radiator to the atmosphere also by convection cooling as air flows through the radiator. At no time does the coolant in a conventional cooling system, operating within normal parameters, change phase from a liquid to a gas.

In a vehicle having an internal combustion engine equipped with the condensation cooling system of the present invention, engine heat is transferred to the atmosphere as follows. In a first step, a first coolant is circulated via a coolant pump through the engine's coolant jacket and through the liquid-to-liquid heat exchanger. The first coolant is heated by contact with the hot surfaces of the coolant jacket.

In a second step, heat is transferred from the first coolant in the liquid-to-liquid heat exchanger to the second coolant in the coolant tank as the heat exchanger is immersed in the second coolant. In a third step, as the second coolant absorbs heat from the heat exchanger, it changes phase from a liquid to a gas via evaporation and, when sufficient heat has been absorbed, by boiling. The resultant second coolant vapor condenses or collects on the condensing panel transferring heat to the condensing panel. In a fourth step, airflow over the surface of the condensing panel causes heat to be transferred from the panel to the atmosphere by means of convection cooling. In a fifth step, second coolant condensate returns to the coolant tank via gravity.

Generally, for the condensation cooling system of the present invention to operate effectively, the boiling point of the second coolant should be lower than that of the first coolant. The airflow of the second coolant vapor inside the coolant tank and hence the ability of the system to remove heat, may be increased with the use of one or more in-tank mounted electric, axial fans which are positioned so as to blow across the surface of the second coolant. The flow of the hot second coolant vapor in the tank may be managed to move the vapor efficiently to the condensing panel, minimizing obstructions, eddies, and stagnant zones. In-tank mounted diffuser plates may be desirable to create and enhance desirable vapor flow conditions.

Typically, the coolant pump in the condensation cooling system of the present invention will be an engine driven pump and therefore the engine is cooled only while it is running. In some applications it may be desirable to substitute an electric coolant pump for an engine driven pump in which case the engine may be cooled even when not running. An auxiliary electric coolant pump may also be used in combination with an engine driven pump in which case the electric auxiliary pump may be used to cool the engine after shutoff.

Turbulent airflow over an exterior surface of the condensing panel is expected to provide increased convection cooling of the second coolant vapor over that of laminar airflow by reducing the boundary layer thickness of the air at the exterior surface of the condensing panel. To manage the airstream and increase turbulence, and thus cooling capacity, aerodynamic features such as canted fins may be mounted on the outside surface of the condensing panel. Fins and like aerodynamic features also serve to suppress flow separation over the condensing panel. Suppression of flow separation aids in reducing drag over the condensing panel.

The above and other advantages of the condensation cooling system of the present invention will be described in more detail below.

BRIEF DESCRIPTION OF THE DRAWINGS

FIG. 11 is a schematic top view of the cooling system of FIG. 10.

DETAILED DESCRIPTION OF THE PREFERRED EMBODIMENTS

The present invention will now be described more fully hereinafter with reference to the accompanying drawings, in which preferred embodiments of the invention are shown. The invention may, however, may be embodied in many different forms and should not be construed as being limited to the embodiments set forth herein. Rather these embodiments are provided so that this disclosure will be thorough and complete, and will fully convey the scope of the invention to those skilled in the art. Like numbers refer to like elements throughout.

Figure 1:
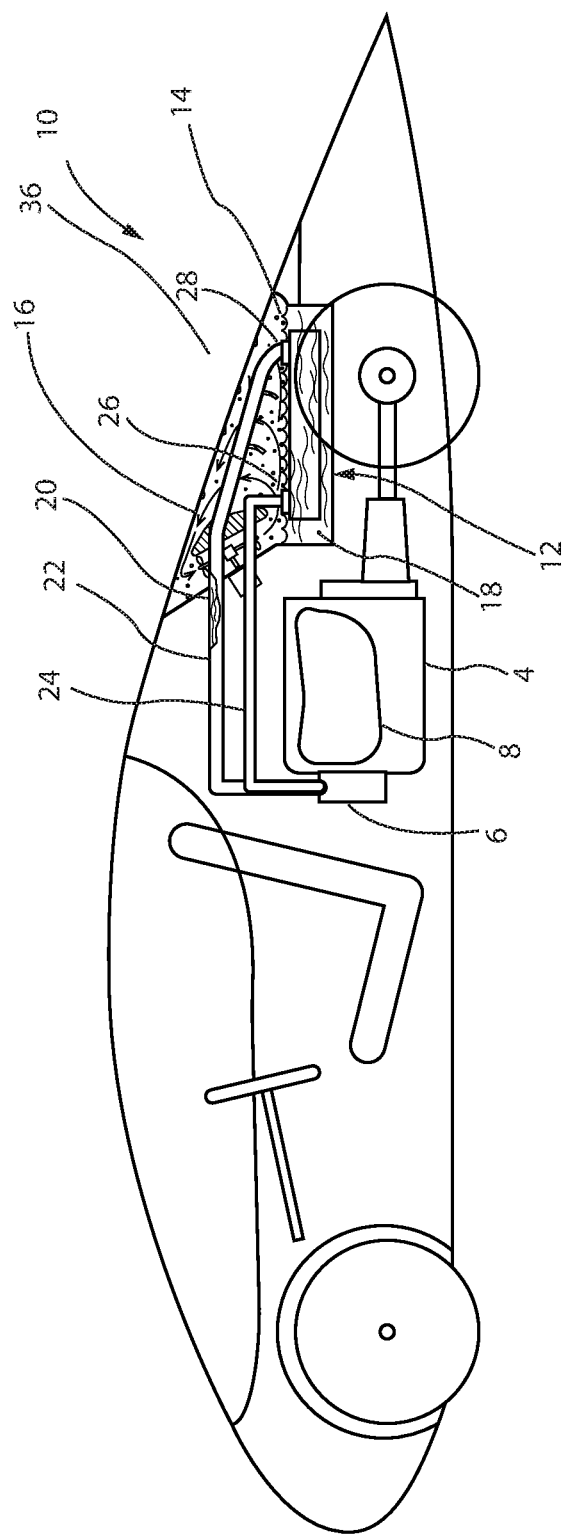
FIG. 1 is a schematic side view of a cooling system in accordance with the present invention shown in a mid-engine vehicle.
Figure 2:
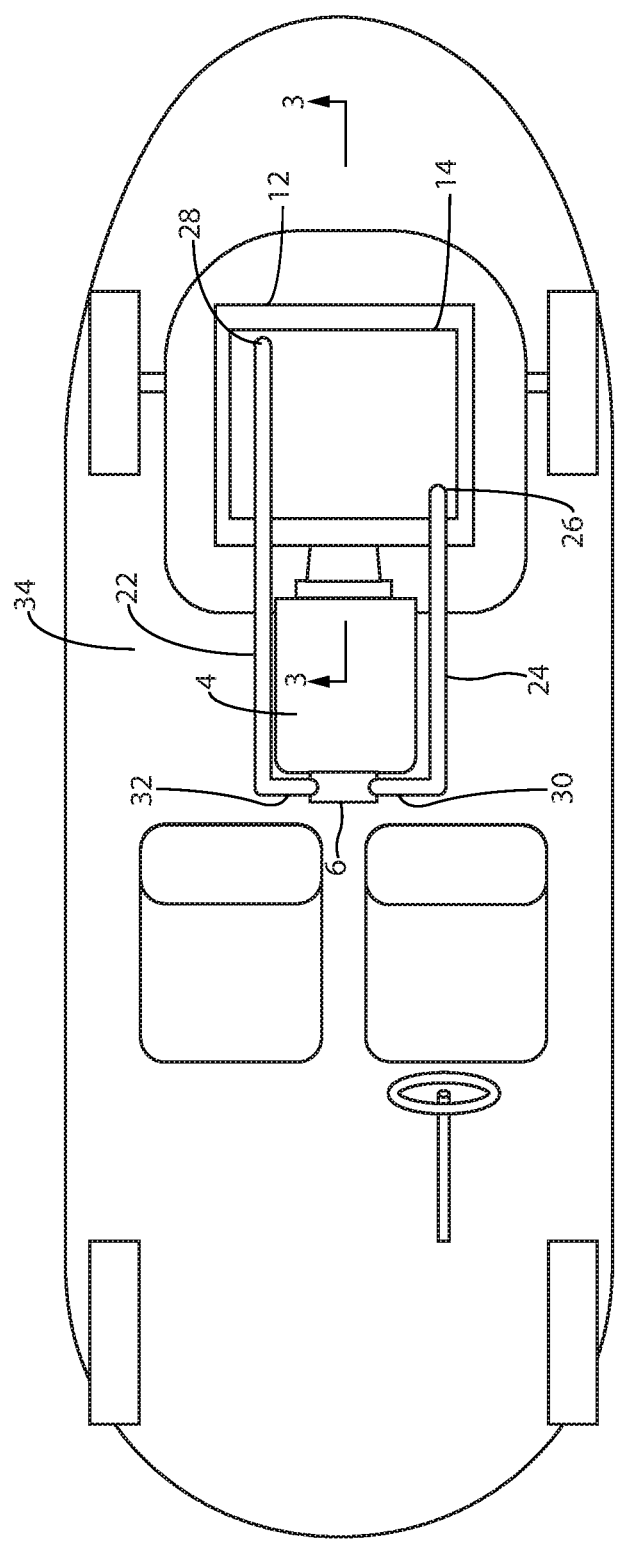
FIG. 2 is a schematic top view of the cooling system of FIG. 1, shown in a mid-engine vehicle.

With reference to FIGS. 1-2, a motor vehicle 2 having an internal combustion engine 4 which includes a coolant jacket 8 and a coolant pump 6 is shown. Enclosed within the motor vehicle 2 is a condensation cooling system 10 in accordance with the present invention. The condensation cooling system 10 comprises a liquid-to-liquid heat exchanger 14 for circulating a first coolant 20, a coolant tank 12 for circulating a second coolant 18, and a condensing panel 16.

The components of the condensation cooling system 10 are arranged in two fluid circuits, i.e. an engine cooling circuit or first cooling circuit 34 in which the first coolant 20 is circulated and a vapor condensing circuit or second cooling circuit 36 in which the second coolant 18 is circulated. The two cooling circuits 34 and 36 are interconnected by the coolant tank 12 where the liquid-to-liquid heat exchanger 14 is positioned within the coolant tank 12 such that it is immersed in the second coolant 18.

With continued reference to FIGS. 1 and 2, the engine cooling circuit 34 comprises the liquid-to-liquid heat exchanger 14 connected in fluid circuit to the coolant jacket 8 of the engine 4 via the coolant pump 6 and interconnecting coolant lines. The liquid-to-liquid heat exchanger 14 includes an inlet 26 for receiving hot first coolant 20 from the coolant pump 6 and an outlet 28 for returning cooled first coolant 20 to the coolant pump 6. The coolant pump 6 includes an outlet 30 from which hot first coolant 20 from the coolant jacket 8 flows to the inlet 26 of the liquid-to-liquid heat exchanger 14 via hot coolant line 24. The coolant pump 6 includes an inlet 32 to which cooled first coolant 20 flows from the outlet 28 of the liquid-to-liquid heat exchanger 14 via cold coolant line 22.

Upon entering the inlet 32 of the coolant pump 6, the cooled first coolant 20 flows through the coolant jacket 8 where it absorbs heat from the engine 4 and flows to the outlet 30 of the coolant pump 6, from which it is again supplied to the inlet 26 of the liquid-to-liquid heat exchanger 14 via hot coolant line 24, where it is again cooled in the liquid-to-liquid heat exchanger 14 and again returned from the outlet 28 of the liquid-to-liquid heat exchanger 14 to the inlet 32 of the coolant pump 6 via the cold coolant line 22. For so long as the coolant pump 6 is operating, the first coolant 20 continuously circulates between the coolant jacket 8 and the liquid-to-liquid heat exchanger 14.

Figure 3:
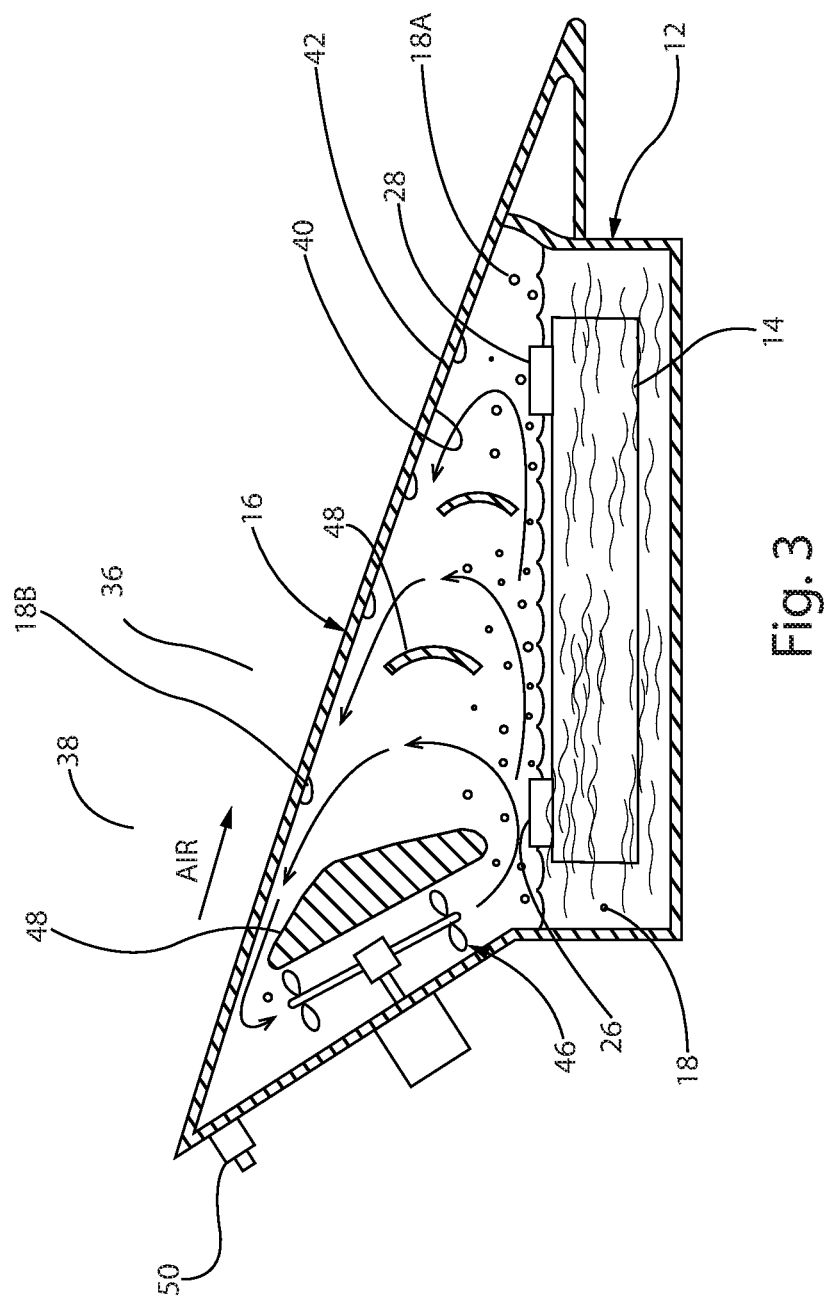
FIG. 3 is schematic side view taken along the line 3-3 of FIG. 2, of the cooling system of the present invention with inlet and outlet hoses not shown for clarity.

With reference to FIGS. 1-3, the vapor condensing circuit 36 comprises the liquid-to-liquid heat exchanger 14, the volume of second coolant 18 within the coolant tank 12 and the condensing panel 16. During operation of the condensation cooling system 10, heat is transferred from the liquid-to-liquid heat exchanger 14 to the second coolant 18. As the second coolant 18 absorbs heat, the second coolant 18 changes phase into a second coolant vapor 18A by evaporation from the surface of the second coolant 18. The rate of evaporation of second coolant vapor 18A increases as the second coolant 18 continues to absorb heat. If sufficient heat is absorbed, the second coolant 18 will boil. By properly choosing the boiling point of the second coolant 18, a rapid, but controlled, phase change of the second coolant 18 from liquid to vapor may be achieved.

Upon the change of phase of the second coolant 18 to second coolant vapor 18A, the second coolant vapor 18A rises within the coolant tank 12 where it contacts an interior surface 40 of the condensing panel 16. The condensing panel 16, being generally at ambient air temperature, is cooler than the second coolant vapor 18A. Therefore, the second coolant vapor 18A condenses into second coolant condensate 18B on the interior surface 40 of the condensing panel 16 and flows by gravity back into the coolant tank 16 to rejoin the volume of second coolant 18, where it is again available to be heated back to the vapor phase.

The condensing panel 16 is cooled by convection and radiation to the atmosphere. External air flow 38 over an exterior surface 42 of the condensing panel 16 increases the rate of heat removal by convection from the condensing panel 16.

With reference to FIG. 3, the rate of evaporation across the surface of the liquid coolant 18 and the velocity at which the second coolant vapor 18A rises towards the condensing panel 16, may be increased by the inclusion of one or more fans 46 oriented to direct airflow across the surface of the second coolant 18 and establish an air and vapor circulation pattern within the coolant tank 12. The air and second coolant vapor 18B circulation pattern may be managed by the addition and selective positioning of one or more diffuser plates 48 within the coolant tank 12. Ideally, a combination of the one or more fans 46 and diffusers plates 48 are used to minimize obstructions to air and second coolant vapor flow, as well as eddies and stagnant zones within the coolant tank 12. In the exemplary embodiment of FIG. 3, the fans 46 are in-tank mounted electric fans. Alternative arrangements where the fans are mounted exterior to the coolant tank 12 are also suitable.

Figure 5:
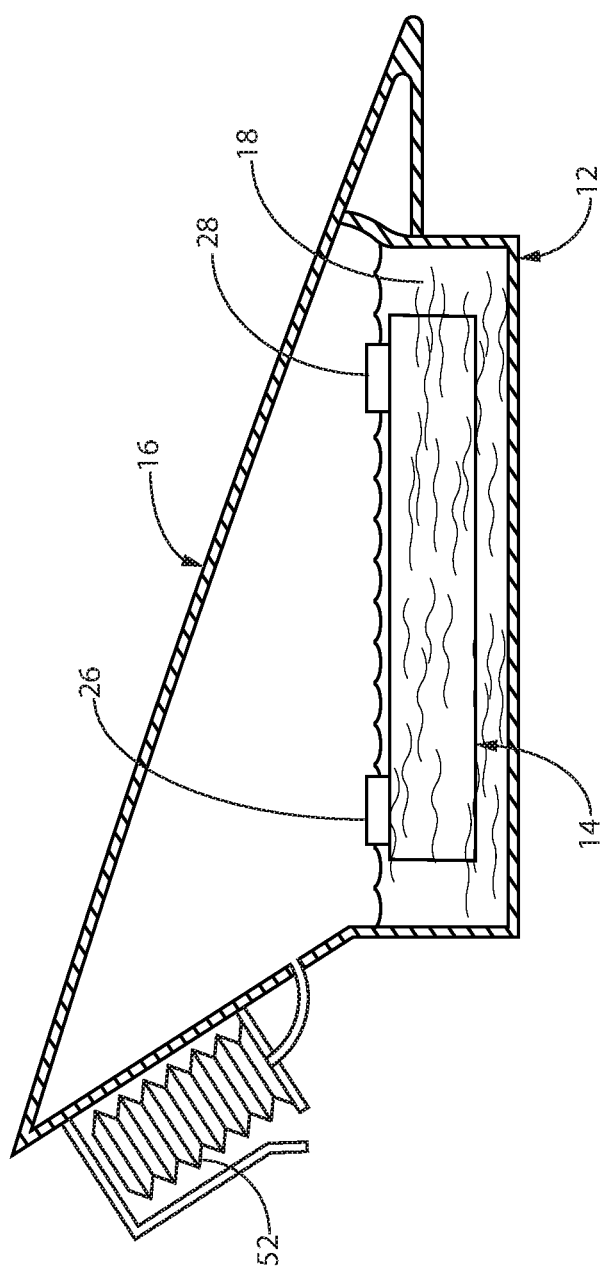
FIG. 5 is an alternative embodiment of a coolant tank for use in the cooling system of the present invention, with the coolant lines not shown for clarity.

The coolant tank 12 must be sealed from the outside environment to prevent leakage of the second coolant 18. With a sealed coolant tank, pressure in the tank will rise as the temperature in the tank increases. Therefore the coolant tank 12 must have sufficient structural strength to accommodate expected operating temperatures and should be configured with a pressure relief mechanism to protect against over-pressure conditions. With reference to FIG. 3, in one embodiment, the coolant tank 12 is equipped with one or more pressure relief valves 50. The one or more pressure relief valves 50 function to vent the coolant tank 12 to the atmosphere in the event an over-pressure condition develops in the tank. With reference to FIG. 5, in another embodiment, the coolant tank 12 may be equipped with an expandable reserve tank 52, which may be used to maintain near atmospheric pressure in the coolant tank 12 over a wide operating temperature range.

Figure 5A:
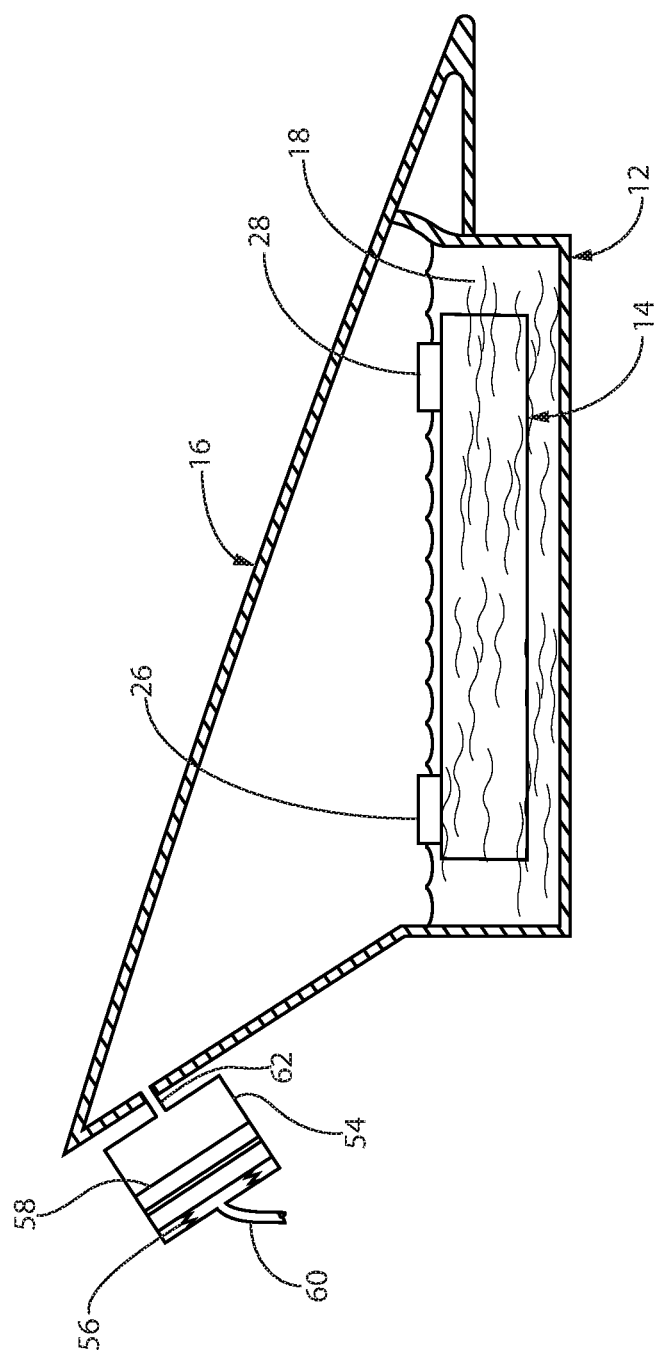
FIG. 5A is another alternative embodiment of a coolant tank for use in the cooling system of the present invention, with the coolant lines not shown for clarity.

With reference to FIG. 5A, in another embodiment, the coolant tank 12 includes a vacuum-piston assembly 54, having a vacuum piston 58, a spring 56, a vacuum port 60, and a coolant tank port 62. The coolant tank port 62 connects the vacuum-piston assembly 54 to the coolant tank 12 and the vacuum port 60 is connected via a vacuum line (not shown) to a source of engine intake manifold vacuum. The vacuum-piston assembly 54 is configured to maintain the coolant tank 12 at atmospheric pressure in the absence of applied vacuum at the vacuum port 60. When vacuum is applied at the vacuum port 60, the vacuum-piston assembly 54 allows vacuum to be applied to the coolant tank 12.

When the engine 4 is not running, no vacuum is present at the engine's intake manifold and consequently, the vacuum-piston assembly 54 maintains the coolant tank 12 at atmospheric pressure. When the engine 4 is running, vacuum is present at the engine's intake manifold and the vacuum-piston assembly 54 applies vacuum to the coolant tank 12. Applying vacuum to the coolant tank 12 will lower the pressure inside the tank which in turn will lower the boiling point of the second coolant 18 and increase the rate of evaporation of the second coolant 18 in the coolant tank 12. A lower boiling point and increased evaporation rate of the second coolant 18 is expected to improve the cooling efficiency of the condensation cooling system 10 of the present invention.

Figure 4:
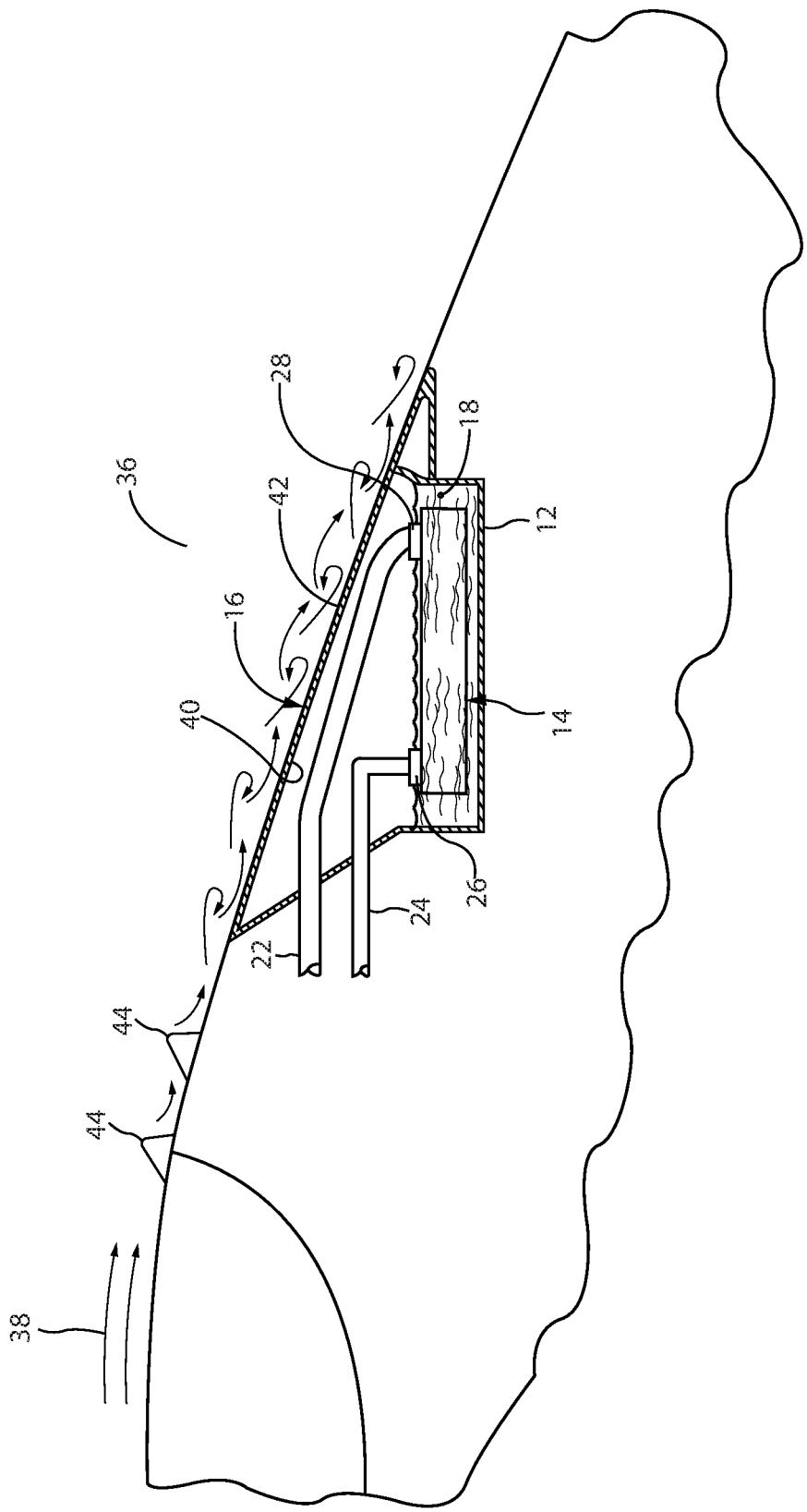
FIG. 4 is a schematic side view taken along the line 3-3 of FIG. 2, of the cooling system of the present invention with the axial motor and diffuser plates not shown for clarity.

With reference to FIG. 4, the ability of external air flow 38 over the exterior surface 42 of the condensing panel 16 to remove heat from the condensing panel 16 via convection may be improved by increasing the turbulence of the air flow. Aerodynamic features, such as canted fins 44 or like features, mounted on the exterior surface 42 of the condensing panel 16, function to create turbulence in the air flow over the condensing panel 16 and therefore improve heat transfer from the condensing panel 16 to the atmosphere. Turbulent air flow is believed to increase heat transfer via convection by reducing the boundary layer thickness of the air at the exterior surface 42 of the condensing panel 16. If configured property, these devices will also suppress flow separation from the exterior surface 42, which will likely reduce drag and thus increase vehicle performance and fuel efficiency.

The condensing panel 16 is formed as part of the coolant tank 12 and also functions as a vehicle body panel. To maximize cooling efficiency, the condensing panel 16 should ideally be formed from a material having a low thermal resistance. The condensing panel 16 must also have sufficient mechanical strength to withstand coolant tank 12 pressure loads, as well as vehicle structural loads if the condensing panel is also designed to act as load carrying vehicle body panel. Steel and aluminum are materials that both offer suitable combinations of thermal conductivity and mechanical strength. To provide a suitable working life, it may be desirable to improve the corrosion resistance of steel and aluminum coolant tanks.

With respect to coolant tanks made from steel, the corrosion resistance of steel may be improved by the use of protective coatings such as nickel plating, ceramic coatings, galvanizing, powder coating and like protective coatings. Inherently corrosion resistant stainless steel is also suitable. With regard to coolant tanks made from aluminum, corrosion resistance may be improved by anodizing, powder coating and like protective coatings.

For the condensation cooling system 10 of the present invention to operate most efficiently, the boiling point of the second coolant 18 should be lower than that of the first coolant 20. Commonly used automotive vehicle water-antifreeze based coolants, such as ethylene-glycol based coolants are suitable for use as the first coolant 20. Deionized water, which may include a corrosion inhibitor, is suitable for use as the second coolant 18.

The coolant pump 6 of the condensation cooling system 10 of the present invention may be either an engine driven pump or an electric pump. Engine driven coolant pumps are commonly used in the majority of automobiles produced today. With an engine driven coolant pump, the condensation cooling system 10 of the present invention operates only when the engine is running. In some applications however, it may be practical to substitute an electric coolant pump for an engine driven pump. Electrically driven coolant pumps provide the advantage of being able to operate the condensation cooling system 10 when the engine is not running. In certain applications such as turbocharged engines with water cooled turbochargers, being able to operate the cooling system with the engine turned off, provides a longevity advantage. An auxiliary electric coolant pump may also be used in combination with an engine driven coolant pump in which case the electric auxiliary coolant pump may be used to cool the engine after shutoff.

Figure 6:
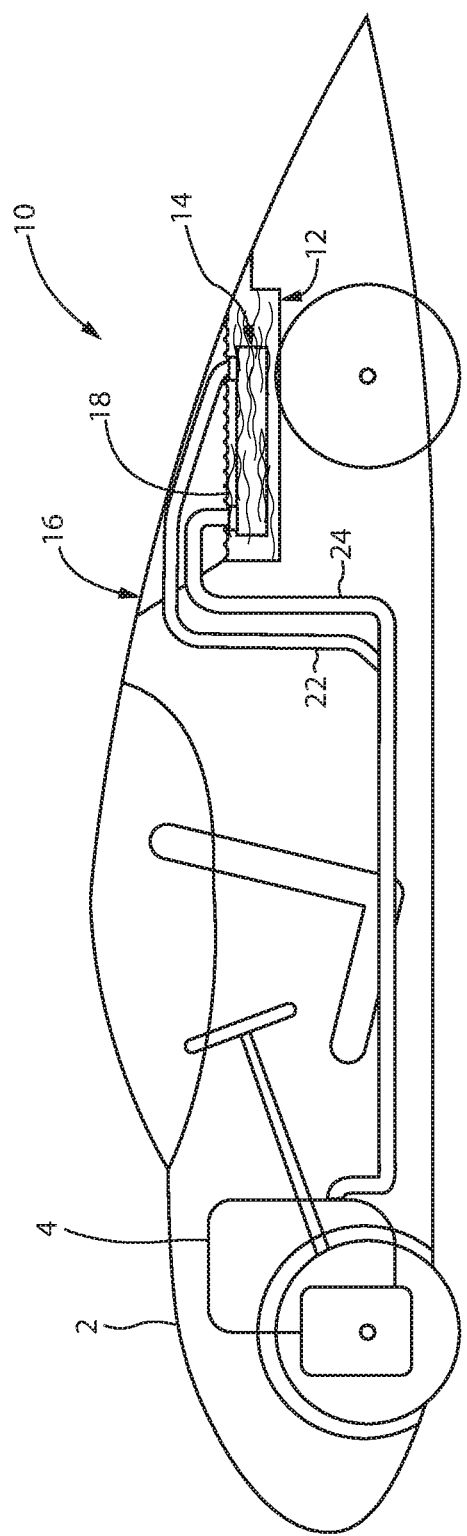
FIG. 6 is a schematic side view of a cooling system in accordance with the present invention shown in a front-engine vehicle.
Figure 7:
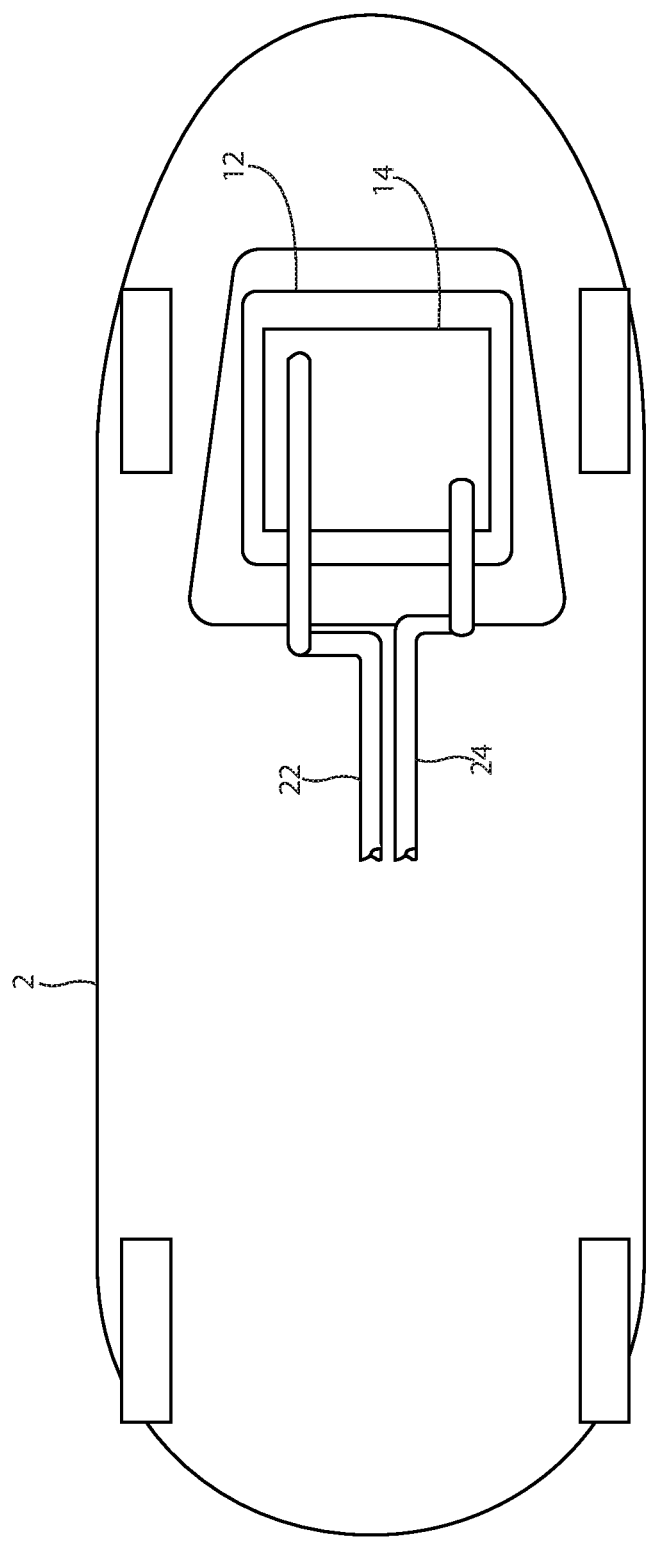
FIG. 7 is a schematic top view of the cooling system of FIG. 6, shown in a front-engine vehicle.
Figure 8:
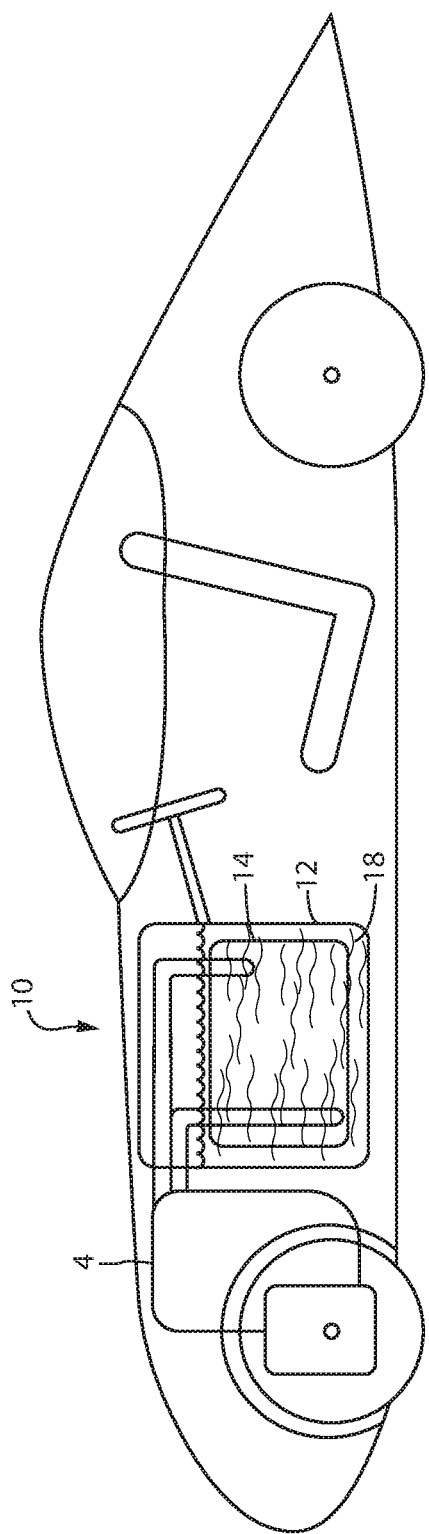
FIG. 8 is a schematic side view of another embodiment of the cooling system in accordance with the present invention shown located in the side of a front-engine vehicle.
Figure 9:
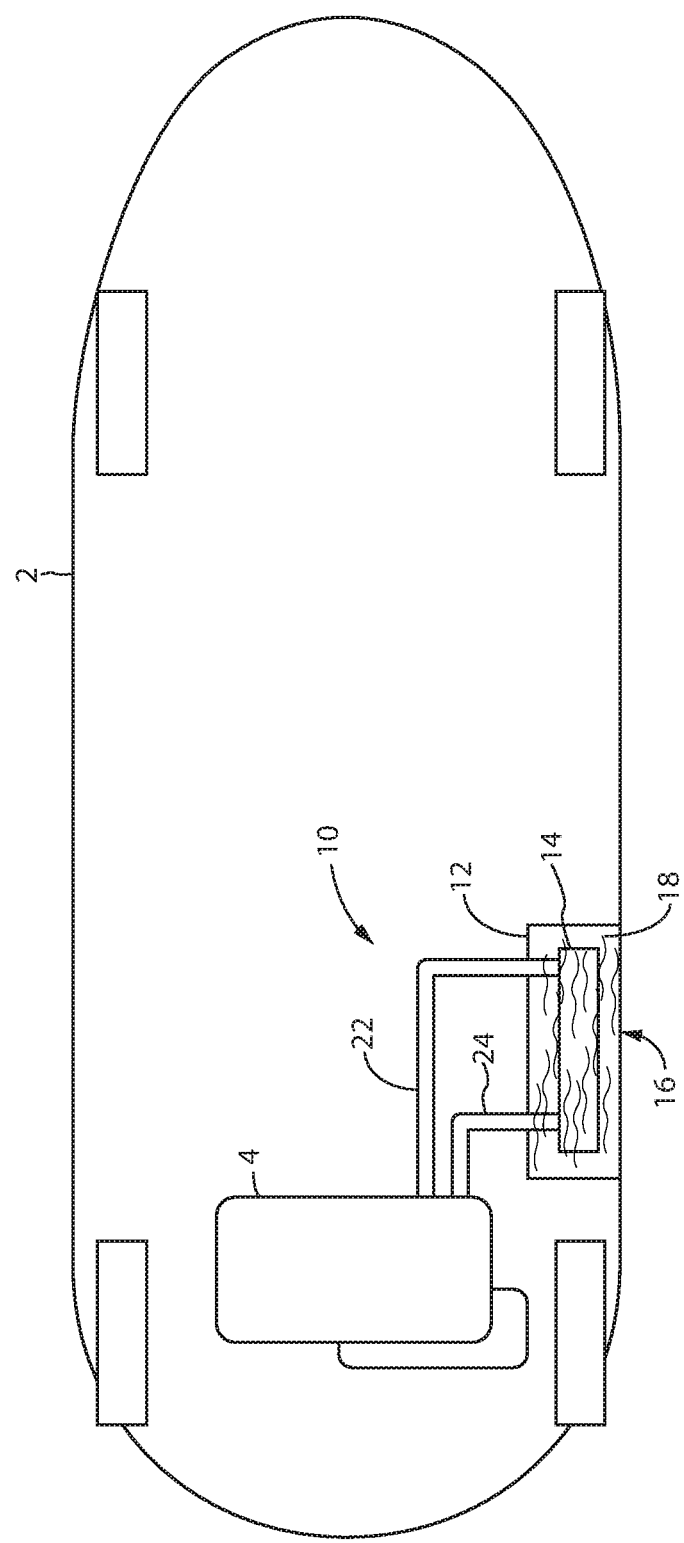
FIG. 9 is a schematic top view of the cooling system of FIG. 8.
Figure 10:
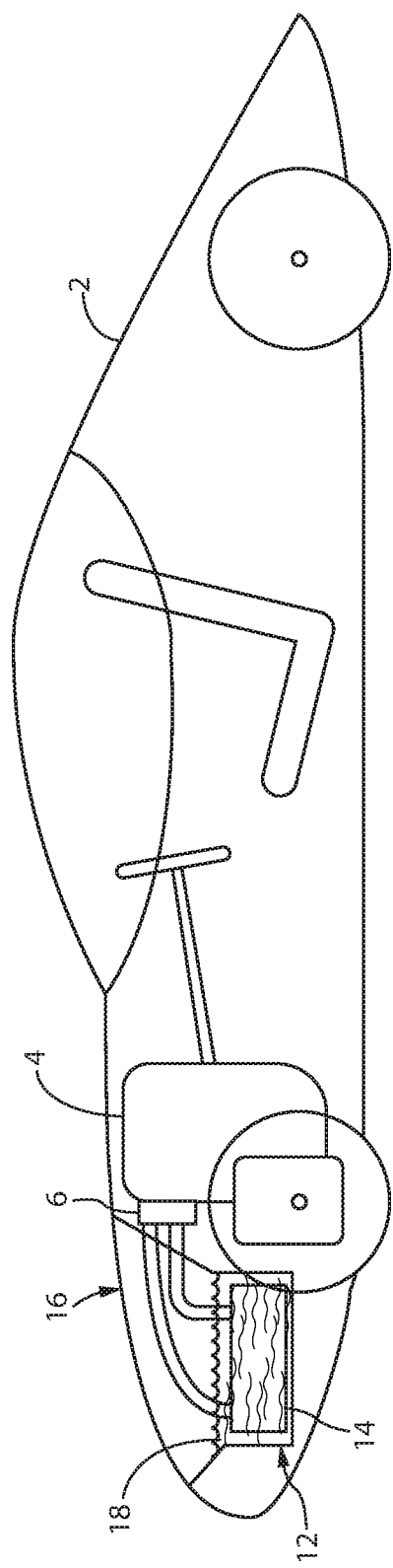
FIG. 10 is a schematic side view of the cooling system in accordance with the present invention shown located in the front of a front-engine vehicle.

FIGS. 1-2 depict the condensation cooling system 10 of the present invention installed in a mid-engine vehicle with the coolant tank 12, liquid-to-liquid heat exchanger 14 and condensing panel 16 installed in the rear of the vehicle 2. The condensation cooling system 10 of the present invention however may be used with virtually any vehicle engine configuration including front engine, mid-engine or rear engine layouts and the cooling system's principal components, i.e. the coolant tank 12, liquid-to-liquid heat exchanger 14 and condensing panel 16 may be located in rear, side, or front of the vehicle. FIGS. 6 and 7 show a schematic representation of a front engine layout with the condensation cooling system 10 located in the rear of the vehicle. FIGS. 8 and 9 show a schematic representation of a front engine layout with the condensation cooling system 10 located in the side of the vehicle. FIGS. 10 and 11 show a schematic representation of a front engine layout with the condensation cooling system 10 located in the front of the vehicle.

In summary, in the condensation cooling system 10 of the present invention, the engine cooling circuit 34 and the vapor condensation circuit 36 act in tandem to cool a vehicle's engine as follows. In a first step, the first coolant 20 is circulated via the coolant pump 6 through the engine's coolant jacket 8 and through the liquid-to-liquid heat exchanger 14. The first coolant 20 is heated by contact with the hot surfaces of the coolant jacket 8. In a second step, heat is transferred from the first coolant 20 in the liquid-to-liquid heat exchanger 14 to the second coolant 18 in the coolant tank 12 as the liquid-to-liquid heat exchanger 14 is immersed in the second coolant 18. Immersion of the heat exchanger 14 in the coolant tank 12 couples the two cooling circuits.

In a third step, as the second coolant 18 absorbs heat from the liquid-to-liquid heat exchanger 14, it changes phase from a liquid to a gas by evaporation and when sufficient heat is absorbed by the second coolant 18, by boiling. The resultant second coolant vapor 18A rises to contact the condensing panel 16 where it condenses as second cooling condensate 18B and thereby transfers heat to the condensing panel 16. In a fourth step, airflow over the exterior surface 42 of the condensing panel 16 causes heat to be transferred from the condensing panel 16 to the atmosphere by means of convection cooling. In a fifth step, condensed second coolant 18B returns to the coolant tank 12 via gravity. The efficiency of evaporation in the coolant tank 12 may be enhanced by the addition of fans 46 and diffuser plates 48 within the tank. Airflow over the exterior surface 42 of the condensing panel 16 may be enhanced with the use of aerodynamic aids such as fins 44, which create turbulence in the air stream and therefore improve convection heat transfer from the condensing panel 16 by reducing the boundary layer thickness of the air near the exterior surface 42 of the condensing panel 16.

If will be appreciated that the condensation cooling system 10 of the present invention improves upon the prior art by replacing conventional radiators with a liquid-to-liquid heat exchanger immersed in a coolant tank having a condensing surface exposed to airflow. The configuration of the condensation cooling system 10 of the present invention allows the heat exchanger to be placed in the rear, side, or front of a vehicle and can be used with front, rear and mid-engine vehicle layouts. Alternative placement of the cooling system, such as rear or side of the vehicle placement allows for the front of a vehicle to be designed for greater aerodynamic efficiency which reduces vehicle drag and consequently allows for improvements in vehicle performance and fuel efficiency.

The foregoing detailed description and appended drawings are intended as a description of the presently preferred embodiment of the invention and are not intended to represent the only forms in which the present invention may be constructed and/or utilized. Those skilled in the art will understand that modifications and alternative embodiments of the present invention which do not depart from the spirit and scope of the foregoing specification and drawings, and of the claims appended below are possible and practical. It is intended that the claims cover all such modifications and alternative embodiments.

The invention claimed is:

1. A condensation cooling system for an internal combustion engine, comprising:
   a first cooling circuit and a second cooling circuit, wherein the first cooling circuit and the second cooling circuit are thermodynamically coupled;
   the first cooling circuit comprising a coolant jacket in fluid circuit with a coolant pump and a liquid-to-liquid heat exchanger, wherein the coolant pump circulates a first coolant through the coolant jacket and the liquid-to-liquid heat exchanger;
   the second cooling circuit comprising a coolant tank, the liquid-to-liquid heat exchanger, a condensing panel and a volume of a second coolant;
   wherein the condensing panel forms a portion of the coolant tank;
   wherein one or more fans are disposed within the coolant tank for forcibly circulating air within the tank;
   wherein the volume of second coolant is contained within the coolant tank and the liquid-to-liquid heat exchanger is positioned within the second coolant, thereby thermodynamically coupling the first cooling circuit and the second cooling circuit;
   wherein, heat from the coolant jacket is absorbed by the first coolant and transferred by the liquid-to-liquid heat exchanger to the second coolant; and
   wherein a portion of the second coolant evaporates and condenses upon the condensing panel, transferring heat to the condensing panel.

2. The condensation cooling system for an internal combustion engine of claim 1, wherein one or more diffuser plates for managing air flow are disposed within the coolant tank.

3. The condensation cooling system for an internal combustion engine of claim 1, further including aerodynamic features that create turbulent air flow over an exterior surface of the condensing panel.

4. The condensation cooling system for an internal combustion engine of claim 1, wherein the first coolant is an ethylene glycol based antifreeze and the second coolant is deionized water.

5. The condensation cooling system for an internal combustion engine of claim 1, wherein the condensing panel functions as a body panel of a vehicle.

6. A condensation cooling system for an internal combustion engine, comprising:
- a first cooling circuit and a second cooling circuit, wherein the first cooling circuit and the second cooling circuit are thermodynamically coupled;
- the first cooling circuit comprising a coolant jacket in fluid circuit with a coolant pump and a liquid-to-liquid heat exchanger, wherein the coolant pump circulates a first coolant through the coolant jacket and the liquid-to-liquid heat exchanger;
- the second cooling circuit comprising a coolant tank, the liquid-to-liquid heat exchanger, a condensing panel and a volume of second coolant;
- wherein the condensing panel forms a portion of the coolant tank;
- wherein the volume of second coolant is contained within the coolant tank and the liquid-to-liquid heat exchanger is positioned within the second coolant, thereby thermodynamically coupling the first cooling circuit and the second cooling circuit;
- wherein, heat from the coolant jacket is absorbed by the first coolant and transferred by the liquid-to-liquid heat exchanger to the second coolant; and
- wherein a portion of the second coolant evaporates and condenses upon the condensing panel, transferring heat to the condensing panel.

7. The condensation cooling system for an internal combustion engine of claim 6, wherein the condensing panel functions as a body panel of a vehicle.

8. The condensation cooling system for an internal combustion engine of claim 6, further including one or more electric fans forcibly circulating air within the coolant tank.

9. The condensation cooling system for an internal combustion engine of claim 8, wherein the one or more electric fans are disposed within the coolant tank.

10. The condensation cooling system for an internal combustion engine of claim 6, wherein one or more diffuser plates for managing air flow are disposed within the coolant tank.

11. The condensation cooling system for an internal combustion engine of claim 6, further including aerodynamic features that create turbulent air flow over an exterior surface of the condensing panel.

12. The condensation cooling system for an internal combustion engine of claim 6, wherein the first coolant includes an ethylene glycol based antifreeze.

13. The condensation cooling system for an internal combustion engine of claim 6, wherein the second coolant is deionized water.

14. A condensation cooling system for an internal combustion engine, comprising:
- a first cooling circuit and a second cooling circuit, wherein the first cooling circuit and the second cooling circuit are thermodynamically coupled;
- the first cooling circuit comprising a coolant jacket in fluid circuit with a coolant pump and a liquid-to-liquid heat exchanger, wherein the coolant pump circulates the first coolant through the coolant jacket and the liquid-to-liquid heat exchanger;
- the second cooling circuit comprising a coolant tank, the liquid-to-liquid heat exchanger, a condensing panel and a volume of second coolant;
- wherein the volume of second coolant is contained within the coolant tank and the liquid-to-liquid heat exchanger is positioned within the second coolant, thereby thermodynamically coupling the first coolant circuit and the second coolant circuit;
- wherein, heat from the coolant jacket is absorbed by the first coolant and transferred by the liquid-to-liquid heat exchanger to the second coolant; and
- wherein a portion of the second coolant evaporates and condenses upon the condensing panel, transferring heat to the condensing panel.

15. The condensation cooling system for an internal combustion engine of claim 14, wherein the condensing panel forms a portion of the coolant tank.

16. The condensation cooling system for an internal combustion engine of claim 14, wherein the condensing panel functions as a body panel of a vehicle.

17. The condensation cooling system for an internal combustion engine of claim 14, further including one or more fans forcibly circulating air within the tank.

18. The condensation cooling system for an internal combustion engine of claim 16, wherein the one or more fans are disposed within the coolant tank.

19. The condensation cooling system for an internal combustion engine of claim 14, wherein one or more diffuser plates for managing air flow are disposed within the coolant tank.

20. The condensation cooling system for an internal combustion engine of claim 14, further including aerodynamic features that create turbulent air flow over an exterior surface of the condensing panel.

21. The condensation cooling system for an internal combustion engine of claim 14, wherein the first coolant includes an ethylene glycol based antifreeze.

* * * * *